(12) United States Patent
Bode et al.

(10) Patent No.: US 11,603,004 B2
(45) Date of Patent: Mar. 14, 2023

(54) SETTING A COMMUNICATION PARAMETER OF A COMMUNICATION MODULE OF A CHARGING STATION

(71) Applicants: Sebastian Bode, Munich (DE); Albert Krenz, Weil der Stadt (DE); Klaus-Peter Linzmaier, Winterbach (DE)

(72) Inventors: Sebastian Bode, Munich (DE); Albert Krenz, Weil der Stadt (DE); Klaus-Peter Linzmaier, Winterbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/041,687

(22) PCT Filed: Feb. 21, 2019

(86) PCT No.: PCT/EP2019/054275
§ 371 (c)(1),
(2) Date: Sep. 25, 2020

(87) PCT Pub. No.: WO2019/185247
PCT Pub. Date: Oct. 3, 2019

(65) Prior Publication Data
US 2021/0008998 A1    Jan. 14, 2021

(30) Foreign Application Priority Data
Mar. 26, 2018   (DE) ..................... 10 2018 204 565.8

(51) Int. Cl.
*B60L 53/30*   (2019.01)
*B60L 53/62*   (2019.01)
(Continued)

(52) U.S. Cl.
CPC ............... *B60L 53/14* (2019.02); *B60L 53/16* (2019.02); *B60L 53/18* (2019.02); *B60L 53/305* (2019.02);
(Continued)

(58) Field of Classification Search
CPC ........ B60L 53/305; B60L 53/62; B60L 53/66; B60L 53/16; B60L 53/18
(Continued)

(56) References Cited

U.S. PATENT DOCUMENTS

| 6,988,053 | B2 * | 1/2006 | Namaky | .............. | G01R 31/007 702/183 |
| 8,515,865 | B1 | 8/2013 | Marathe | | |

(Continued)

FOREIGN PATENT DOCUMENTS

| CN | 205581229 U | 9/2016 |
| DE | 102011010809 A1 | 8/2012 |

(Continued)

OTHER PUBLICATIONS

Notice of Submission the International Provisional Patentability Report for International Patent Application PCT/EP2019/054275 dated Jun. 19, 2020.

(Continued)

*Primary Examiner* — Suresh Memula
(74) *Attorney, Agent, or Firm* — Lempia Summerfield Katz LLC

(57) ABSTRACT

The invention relates to a method for setting at least one communication parameter of a communication module (28) of a charging station (10), used for communication, in particular wired communication, via an interface (18) of the charging station (10). The invention addresses the problem of enabling the at least one communication parameter to be set in the simplest manner possible, with significant reli- (Continued)

ability and great security. It is proposed according to the invention that: —a calibration device (56) is coupled to the interface (18), —authentication data is transmitted from the calibration device (56) to the communication module (28), —a value for the at least one communication parameter is transmitted from the calibration device (56) to the communication module (28), and—the at least one communication parameter is set by the communication module (28) depending on an evaluation of the authentication data by the communication module (28) according to the value transmitted.

18 Claims, 3 Drawing Sheets

(51) Int. Cl.
    *B60L 53/66*      (2019.01)
    *B60L 53/16*      (2019.01)
    *B60L 53/18*      (2019.01)
    *B60L 53/14*      (2019.01)
    *H02J 50/10*      (2016.01)
    *H02J 7/00*      (2006.01)

(52) U.S. Cl.
    CPC ............... *B60L 53/62* (2019.02); *B60L 53/66* (2019.02); *H02J 7/0013* (2013.01); *H02J 50/10* (2016.02)

(58) Field of Classification Search
    USPC .......................................................... 320/109
    See application file for complete search history.

(56) References Cited

U.S. PATENT DOCUMENTS

| | | | | |
|---|---|---|---|---|
| 2010/0007311 A1* | 1/2010 | Colin | ................ | H01M 10/4207 320/134 |
| 2010/0076615 A1* | 3/2010 | Daniel | ..................... | H02J 3/28 700/293 |
| 2013/0020993 A1* | 1/2013 | Taddeo | ............... | H02J 7/00045 320/109 |
| 2013/0154667 A1 | 6/2013 | Scheu | | |
| 2013/0317979 A1* | 11/2013 | Marathe | .................. | B60L 53/62 705/39 |
| 2013/0338824 A1* | 12/2013 | Becker | ................. | B60L 53/305 700/237 |
| 2014/0036989 A1 | 2/2014 | Heinrich | | |
| 2014/0077762 A1* | 3/2014 | Spanos | ................... | B60L 53/30 320/109 |
| 2017/0203667 A1* | 7/2017 | He | ........................ | H01M 10/46 |
| 2018/0091191 A1 | 3/2018 | Berger et al. | | |
| 2018/0354383 A1* | 12/2018 | Namou | ................ | B60L 53/126 |
| 2020/0047623 A1* | 2/2020 | Zadrozny | ................ | B60L 53/37 |
| 2020/0274375 A1* | 8/2020 | Griffiths | ................ | H02J 7/1423 |
| 2021/0086645 A1* | 3/2021 | Kirschner | ............. | H02J 7/0042 |
| 2021/0354584 A1* | 11/2021 | Dietz | ...................... | B60L 53/68 |

FOREIGN PATENT DOCUMENTS

| | | | | |
|---|---|---|---|---|
| DE | 102011007912 A1 | 10/2012 | | |
| DE | 102011056501 A1 | 6/2013 | | |
| EP | 2958345 A1 | 12/2015 | | |
| JP | 2013046477 A | 3/2013 | | |
| JP | 2013247688 A | 12/2013 | | |
| JP | 6172057 B2 | 8/2017 | | |
| WO | WO-2020187610 A1 * | 9/2020 | ............. | B60L 53/67 |

OTHER PUBLICATIONS

Written Notice of the International Preliminary Audit Authority for International Patent Application PCT/EP2019/054275 dated Mar. 12, 2020.
International Standard ISO 15118-3: "Road vehicles Vehicle to grid communication Interface—Part 3 Physical and data ink layer requirements"; ISO 2015; May 15, 2015; ISO 15188-3:2015, published in Switzerland.
Van Den Bossche, Peter. "IEC/TS62763: Pilot function through a control pilot circuit using PWM (pulse width modulation) and a control pilot wire." (2013).
Wikipedia: "Handshaking"; Version v. 25.3.18.

* cited by examiner

SETTING A COMMUNICATION PARAMETER OF A COMMUNICATION MODULE OF A CHARGING STATION

CROSS REFERENCE TO RELATED APPLICATIONS

This present patent document is a § 371 nationalization of PCT Application Serial Number PCT/EP2019/054275 filed Feb. 21, 2019, designating the United States, which is hereby incorporated in its entirety by reference. This patent document also claims the benefit of DE 102018204565.8 filed on Mar. 26, 2018 which is also hereby incorporated in its entirety by reference.

FIELD

Embodiments relate to methods for setting at least one communication parameter of a communication module of a charging station that is used for communication via an interface of the charging station.

BACKGROUND

Charging stations, communication modules, and calibration devices are known in the prior art. Charging stations are used for example to supply electrical devices, that include an electrical energy store for operation, with electrical energy so that the electrical energy store may be charged. Electrical devices may be, for example electrically drivable motor vehicles.

An electrically drivable motor vehicle is a motor vehicle that includes an electrical drive device for its intended driving operation. If the motor vehicle includes only the electrical drive device as the drive device, it is an electric vehicle. If a further drive device is additionally provided instead, for example an internal combustion engine or the like, the electrically drivable motor vehicle is a hybrid vehicle.

During intended operation of the electrical devices, for example the electrically drivable motor vehicles, electrical energy that is provided by a respective electrical energy store of the electrical device or of the electrically drivable motor vehicle is consumed. The electrical energy store is in the form of a rechargeable battery.

In electrically drivable motor vehicles, the rechargeable battery is often in the form of a high-voltage battery. Like other electrical devices of the generic type as well, electrically drivable motor vehicles must be regularly electrically coupled to a charging station, with the result that electrical energy may be supplied to the respective electrical energy store in order to be able to continue the intended operation after the energy-related coupling to the charging station has been terminated.

Charging stations are devices that are arranged in a stationary manner and are configured to be coupled, in an energy-related manner, to the electrical devices, for example the electrically drivable motor vehicles. The energy-related coupling may be in the form of wired energy-related coupling, for example, by virtue of a charging cable of the charging station being electromechanically coupled to the electrical device or to the electrically drivable motor vehicle, for example. In addition, it is also possible to provide wireless energy-related coupling, for example using an alternating magnetic field or the like.

For the intended operation of the charging station, it is necessary to enable communication between the charging station and the electrical device or the motor vehicle. This makes it possible to control the charging operation in a desired manner. Communication generally takes place via a corresponding communication line. The latter may be integrated, for example in the case of wired energy-related coupling, in the charging cable of the charging station providing the wired energy-related coupling. However, communication may also occasionally be implemented in a wireless manner, for example using short-range radio, infrared, ultrasound and/or the like. In this context, EP 2 958 345 A1 discloses an attenuation-level-based association in communication networks. DE 10 2011 010 809 A1 also discloses a charging station and a method for protecting an operation of charging an electric vehicle.

A machine translation of JP 6172057B2 discloses a charging system which is based on the object of making it possible to change the type of charging in order to select AC charging or DC fast charging in the case of stable PLC communication (power line communication). For this purpose, the charging system comprises a charging control unit which is provided in the vehicle and is intended to transmit and receive a control signal and to control the charging via a control line provided in the charging cable and a control unit which is provided in the vehicle and is connected to the power supply control unit. A respective PLC modem comprises an amplitude setting unit for increasing the amplitude of the communication signal in order to improve PLC communication during DC fast charging in comparison with AC charging.

US 2013/0317979 A1 discloses a method which, after initial communication between a vehicle and a charging station has been established, provides for an expected voltage for charging a battery in the vehicle to be stipulated during initial communication. The phase of initial communication between the vehicle and the charging station is then ended. Electrical energy delivered by the charging station is then received at the vehicle and the electrical voltage actually applied during the electrical energy is compared with the expected voltage, that is to say the voltage stipulated during initial communication. If the actual voltage and the expected voltage correspond, the charging operation is approved or authorized.

In order to be able to achieve reliable communication, the charging station provides the communication module that makes it possible to set the desired communication using at least one communication parameter in such a manner that reliable communication may be provided at least during charging operation. However, since communication may be dependent on a number of environmental parameters, for example including an installation location of the charging station, a length of the charging cable, but also properties of the motor vehicle connected to the charging cable and/or the like, it does not suffice to calibrate the at least one communication parameter to a predetermined value when producing the charging station or the communication module for the charging station, because the functionality with respect to communication may also be dependent, inter alia, on an installation position of the communication module in the charging station, a type and length of the charging cable or of the communication interface and an impedance of a ground connection and/or the like. The communication module may be able to set the at least one communication parameter.

Two different methods for setting the at least one communication parameter are known in the prior art. A first method, also called design calibration, provides for a calibration to be carried out once for each design and for all charging stations of the same design to be set to the same value with respect to their at least one communication parameter. As long as tolerances, for example with respect to a mechanism, a length of lines installed in the charging station, for example ground lines and the charging cable, are low, a sufficiently usable calibration may be achieved across the series as a result.

A second method, also called piece calibration, provides for the calibration to be carried out individually for a respective charging station, as a result of which tolerances or even differences when using different components may be easily taken into account. Logistical advantages prevail in piece calibration. However, piece calibration cannot be carried out using conventional calibration in which values for the at least one communication parameter must be integrated in a computer program of the charging station, for example. Rather, it is necessary for the at least one communication parameter to be able to be set in a simple manner and with great reliability by assembly or maintenance personnel either when producing the charging station or after the charging station has been produced. This is also intended to be possible when maintaining the charging station if it is used in the intended mode.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a mechanism to set the at least one communication parameter as easily as possible and with great reliability and great security.

In an embodiment, a method provides where a calibration device is coupled to the interface, authentication data are transmitted from the calibration device to the communication module, a value for the at least one communication parameter is transmitted from the calibration device to the communication module, and the at least one communication parameter is set by the communication module on the basis of an evaluation of the authentication data by the communication module according to the transmitted value.

In an embodiment, a method provides where a calibration device is coupled to the interface, authentication data are transmitted from the calibration device to the communication module, a communication signal from the communication module is received and evaluated by the calibration device in order to determine at least one signal parameter on the basis of the received communication signal, the at least one signal parameter is transmitted from the calibration device to the communication module, and the communication module sets the at least one communication parameter on the basis of the at least one signal parameter and an evaluation of the authentication data.

In an embodiment a calibration device is configured to be coupled to the interfaces, to transmit authentication data to the communication module, and to transmit a value for the at least one communication parameter to the communication module so that the communication module sets the at least one communication parameter on the basis of the transmitted value and an evaluation of the authentication data by the communication module.

In an embodiment a calibration device is configured to be coupled to the interface, to transmit authentication data to the communication module, to receive and evaluate a communication signal from the communication module in order to determine at least one signal parameter on the basis of the received communication signal, and to transmit the at least one signal parameter to the communication module so that the communication module sets the at least one communication parameter on the basis of the at least one signal parameter and an evaluation of the authentication data.

In an embodiment, in order to set at least one communication parameter, the communication module is configured to receive authentication data from a calibration device that may be coupled to the interface, to receive a value for the at least one communication parameter from the calibration device, and to set the at least one communication parameter on the basis of an evaluation of the authentication data according to the received value.

In an embodiment, in order to set at least one communication parameter, the communication module is configured to receive authentication data from a calibration device that may be coupled to the interface, to emit a communication signal so that the calibration device receives and evaluates the communication signal in order to determine at least one signal parameter on the basis of the received communication signal, to receive the at least one signal parameter from the calibration device, and to set the at least one communication parameter on the basis of the at least one signal parameter and an evaluation of the authentication data.

In an embodiment, a charging station is provided where the communication module is configured as described herein.

Embodiments provide where at least one communication parameter may be easily set by the calibration device. The calibration device is communicatively connected to the communication module via the interface of the charging station, with the result that the communication module may receive a value for the at least one communication parameter to be set. So that not any desired calibration device may be used to set the value of the communication parameter and to therefore be able to act on the function of the charging station, embodiments provide the authentication data. The authentication data may provide that only calibration devices for which there is a predefined authorization may be used to set the at least one communication parameter. A suitable authentication method may be used for this purpose.

Therefore, it is not necessary to connect the charging station to a control center via a permanent communication connection to be able to set the at least one communication parameter. This is advantageous when the charging station is arranged away from a communication network and a corresponding communication connection requires an increased outlay or cannot be implemented.

In addition, embodiments avoid unauthorized access to the charging station via a communication network because a permanent communication connection does not need to be available. Rather, the embodiments provide for the calibration device to be used for this purpose.

The calibration device may be a portable unit that may be transported to the charging station to communicatively connect it to the charging station via the interface of the latter. The calibration device may thus be used if the charging station has already been installed at its intended location. However, the calibration device may also be provided for producing the charging stations or the communication module. In this case, the calibration device does not need to be transported to the charging station or the communication module. Nevertheless, the calibration device may be a compact unit, for example a portable unit, that is easy to handle and may include a suitable device interface that may be communicatively connected to the interface of the charging station.

The interface may be formed, for example, by a plug-in connection or the like that may be used to establish a wired communication connection. In addition, the interface may be implemented as a wired communication connection via lines of the charging cable of the charging station. In this case, the interface may be adapted to the lines of the charging cable.

The operation of setting the at least one communication parameter does not need to involve changing a computer program or hardware of the charging station. For example, only a value for the at least one communication parameter may be stored in a storage unit of the communication module or the charging station. The value is set accordingly. Therefore, there is no need to access any computer program and any further hardware of the communication module or of the charging station.

The at least one communication parameter may be, for example, a carrier in wireless communication methods such as short-range radio, infrared, ultrasound and/or the like or in a carrier frequency method, for example with respect to wired communication, that is intended to be used for communication. In addition, the at least one communication parameter may also include a transmission power, for example an amplitude and/or the like. Furthermore, the communication parameter may also relate to any coding that is intended to be used for communication. It is therefore possible to be able to set the coding in a suitable manner as needed, with the result that the communication reliability or the communication security may be set. For example, the communication parameter may also relate to a frequency that is intended to be selected for using communication. A plurality of carriers and/or frequencies may also be set or selected using a communication parameter. Further combinations that may be used to set communication may also be covered by the at least one communication parameter.

The communication module is a unit, for example an electronic unit, that is used to provide communication at least with the calibration device. The communication module may be part of the charging station and may be arranged in a housing of the charging station, for example. Alternatively, or additionally, however, the communication module may also be arranged in a manner at least partially separate from the charging station.

In addition, the communication module may also be used such that a charging station may communicate with a motor vehicle connected to the charging station. Communication may take place via the charging cable. In this case, it is possible for communication to be able to take place via at least two electrical lines of the charging cable. In addition, communication may also be provided using a pilot line that is often included in the charging cable. Combinations thereof may also be provided.

The interface of the charging station may be an interface for wired communication that may either be a separate hardware interface or may be combined with other units of the charging station, for example a charging controller or the like. The communication module therefore does not need to be configured exclusively for communication with the calibration device.

In order to enable wired communication between the communication module and the calibration device, the calibration device may be coupled to the interface. Coupling may be affected in an electromechanical manner, for example via a plug-in connection or the like. Wireless coupling, for example based on short-range radio in a local area and/or the like, may also be provided, thus making it possible to avoid interference on account of unfavorable contact resistances and/or the like. In this context, the local area includes an area of one or more cm up to a communication range of approximately 5 m.

The calibration device may be in the form of a plug-in connector that may be connected in an electromechanically releasable manner to an accordingly complementary plug-in connector of the charging cable that is used for connection to a motor vehicle. The interface may be integrated in the charging cable and there is therefore no need for a separate interface to be provided on the charging station.

So that the charging station, for example the communication module, identifies that interchanged data come from a reliable source and are approved for further use, the calibration device is configured to transmit authentication data to the communication module after it has been coupled to the interface. On the basis of the authentication data, the communication module may determine whether the calibration device is approved for setting the at least one communication parameter, e.g. a valid authorization. This makes it possible to avoid the situation in which unauthorized third parties manipulate the at least one communication parameter and the intended functionality of the charging station may therefore be impaired.

The communication module may be formed in one piece with a control unit of the charging station, for example. The control unit may be used to provide the predefined charging functionality of the charging station by virtue of a charging controller and/or the like being controlled accordingly, for example.

In order to be able to implement the authentication, a special functionality that is provided in the communication module or the control unit and is signed by a central trusted authority may also include an authorization module including one or more rules in a set of rules that may be used to determine entities that may manipulate or set the at least one communication parameter. The functionality may be provided, for example, by an electronic hardware circuit or by a computer program running on a computer unit and combinations thereof. For example, the charging station or the control unit or the communication module may include a suitable computer program for this purpose that also has, inter alia, a package manager. If, for example, the functionality of the interface of a charging station that has already been activated is intended to be set in situ, for example setting of attenuation values for particular carriers or the like in the case of a power line communication connection, particular service personnel may bring a suitably equipped calibration device to the location of the charging station and may connect the calibration device to the interface of the charging station. In this case, it may be assumed to be known, for example, that minimum and maximum values for the at least one communication parameter to be set may be known, for example, from other charging stations of the same type, for example attenuation values or the like.

In order to be able to carry out the setting operation, corresponding data, for example in the form of a file or the like, may be automatically generated and signed, for example, and to then be stored on the calibration device. The calibration device may provide the data. In this case, the data do not contain a computer program that is used to control the charging station and/or the communication module, but rather a checking module, values for the at least one communication parameter to be set and/or the like, for example. If a checking module is present, it may be implemented in the form of a script, for example, that reads in configuration parameters, that is to say values for the at least one communication parameter to be set, during package installation from a file provided by the calibration device and cryptographically protected by the latter by a signature, checks the configuration parameters against plausibility data that are stored in the data and may be derived, for example, from the minimum and maximum values, and accepts the parameters if the check is successful. The checking module may therefore be used to support or provide the authentication of the at least one communication parameter.

During a signature check of the file, the script may also check, for example, whether the certificate used by the calibration device for the signature is valid and access by the calibration device is permissible at a predefined time or the like. The file may include, for example, a hash value, a private key of the calibration device, public keys that may be included in the certificate, for example, and/or the like. This may provide the check to be precise without the communication module and the calibration device having to be communicatively connected to a communication network online. The data may be permanently stored in the checking module that has been specifically generated for the one charging station, with the result that the check may be carried out offline, specifically by connecting only the calibration device to the interface of the charging station. However, the checking module may also have a generic design and may include only the information needed to identify and authorize the calibration device, for example.

If the check reveals that the prerequisites are not met, the operation of setting the communication parameters may be aborted. For the maintenance personnel, it may then be possible to request a new order with extended rights, for example. For this purpose, it may then be necessary to equip the calibration device with new data, e.g. with extended rights, that is to say with a less restricted checking module or the like, for example. The operation of setting the at least one communication parameter may also be dependent in this case on a presence of further credentials.

The configuration provides invariable, but parameterizable functionalities of the communication module or of the control unit together with a checking device on the charging station side, with the result that configuration possibilities may be restricted by the calibration device to such an extent that high security requirements may be complied with. In this case, it proves to be advantageous if the data for the calibration device are created automatically. The data relating to the calibration device, that is intended to process an order, are then also taken into account during creation. This makes it possible to achieve the situation in which authorizations may be checked, even in the case of charging stations that do not have any possibility of checking authorizations online, without the charging station itself needing to be configured for such a type of check.

The inclusion of further credentials may extend the check, for example, to scenarios such as:
  changes are only jointly possible by two persons,
  changes are dependent on the presence of an acknowledgement for a previous successful transmission of data,
  changes are permissible only in particular system states of the charging station,
  changes are dependent on a particular state of a functionality of the charging station having been achieved, for example a current computer program version, thus closing security gaps in connection with the at least one communication parameter, and/or the like.

The at least one communication parameter may be set, for example, by a package manager that executes scripts contained in the package during installation. At least one script may include the checking module. The package manager may carry out the installation so that the script may also be executed. The script may also be used to check the at least one rule in the set of rules and the further conditions.

The calibration device may be a separately portable unit, for example a laptop, a PDA, or only an electronic storage unit or the like. The calibration device includes a housing that has an interface complementary to the interface of the charging station, with the result that the intended releasable communication connection between the calibration device and the charging station or the interface of the latter may be established. The authentication data may be, for example, data that may be included in the file or authentication file. If the authentication has been carried out successfully, the at least one communication parameter may be set accordingly.

Embodiments provide for a value for the at least one communication parameter to be transmitted from the calibration device to the communication module. The value may then be accordingly adopted by the communication module and/or the control unit for the communication parameter to be set. The value for the at least one communication parameter may be transmitted before authentication or after authentication. The value may also be transmitted together with authentication data.

The at least one communication parameter is then set by the communication module on the basis of an evaluation of the authentication data by the communication module according to the determined value.

In an embodiment, the calibration device receives a communication signal from the communication module and determines the value for the at least one communication parameter on the basis of the received communication signal. The functionality of the charging station, for example of the communication module, may be taken into account when determining the value for the at least one communication parameter. This is advantageous if the interface is simultaneously provided by the charging cable and the functionality is therefore intended to be taken into account with respect to the structure of the charging cable and the interaction with the communication module. For example, the value for the at least one communication parameter may relate to an attenuation, a power, for example an amplitude, of a carrier, or a carrier frequency and/or the like. In addition, the value may also indicate fundamental use of a carrier and/or a carrier frequency, for example by virtue of one or more selected carriers intending to be used only for communication.

A plurality of values may also be able to be transmitted in the case of a plurality of communication parameters. A single value to be transmitted for one or more communication parameters. For example, communication parameters may be grouped and for a value to relate to a respective group of communication parameters. This may be implemented, for example, for the situation in which certain predefined frequency ranges are intended to be used for communication of the communication module. The frequency ranges need not adjoin one another, but rather may also be separated by unused frequency ranges.

The communication signal includes at least one data message and the value is determined on the basis of the at least one data message. A data message is, for example, a communication element including data elements that are transmitted in a manner combined to form a unit to be transmitted. The data message may be based on digital data that are provided according to predefined coding and/or encryption. The data may then be transmitted as a data unit, for example using particular transmission methods such as block coding or the like. A data message requires a comparatively short period and the communication conditions during the transmission of the data message are substantially steady. If the data message is used as the communication signal, the value may therefore be determined very accurately. In addition, it is also possible to use a plurality of data messages, for example with different data content, to determine the value, with the result that the determination of the value may be improved further. For example, it is possible to additionally consider statistical methods for determining the value, for example a mean value or the like.

In an embodiment, the communication signal from the communication module is received and evaluated by the calibration device to determine at least one signal parameter on the basis of the received communication signal. The signal parameter may be, for example, a reception field strength, an attenuation, a reception power, a reception frequency and/or the like. A plurality of signal values may also be included in a signal parameter. The signal parameter may be determined continuously or in a time-discrete manner, for example repeatedly in a time-discrete manner.

The at least one signal parameter is transmitted from the calibration device to the communication module, whereupon the communication module then sets the at least one communication parameter on the basis of the at least one signal parameter and an evaluation of the authentication data. The communication module checks whether the calibration device that is connected to the interface is authorized to transmit signal parameters to the communication module. If the authorization is present, the communication module evaluates the at least one signal parameter and sets the at least one communication parameter on the basis thereof. A plurality of signal parameters may be used to set a single communication parameter. For example, in the case of a plurality of communication parameters, one or more signal parameters may be determined by the calibration device and to be transmitted to the communication module in order to set a respective one of the communication parameters. In this case too, a signal parameter may be able to be used to set two or more communication parameters. Statistical methods may be used to improve the setting operation.

In an embodiment, the communication signal includes at least one data message and the signal parameter is determined on the basis of the at least one data message. The data message already explained above may be used to determine the at least one signal parameter. Two or more signal parameters may also be determined on the basis of the data message. A plurality of data messages may likewise also be used to determine a respective signal parameter.

The value and/or a change of the value of the at least one communication parameter is transmitted to a control center. The transmission may likewise be carried out using the calibration device. The communication module may transmit the value that has been set to the calibration device. If the calibration device is communicatively connected to the control center at a later time, the communication parameter that has been set may be transmitted from the calibration device to the control center. The respective setting of the communication parameters of the charging station is also available at the control center. This may be used to better determine preset values for producing further charging stations. In addition, in the event of a repair, a communication module that is to be replaced may already be equipped in the factory with the required current communication parameters, for example, with the result that only the mechanical replacement of the communication module needs to be carried out in situ at the charging station. This makes it possible to further simplify the maintenance or the repair of the charging station, for example of the communication module.

In an embodiment, the at least one communication parameter is automatically set if the calibration device has been authenticated. This configuration has the advantage that no further interventions, for example by the maintenance personnel, need to be carried out in order to be able to set the at least one communication parameter. Only the communication connection between the communication module and the calibration device needs to be established.

In an embodiment, the operation of setting the at least one communication parameter is monitored by the calibration device. This makes it possible to check the functionality of the setting operation with respect to the communication module. This makes it possible to ensure that the desired setting of the communication module has also actually been achieved. The reliability may be further improved thereby. If the monitoring reveals that the value to which the at least one communication parameter is intended to be set has not been reached or cannot be reached, a corresponding fault message may be output and/or stored, to be precise in the calibration device and/or in the communication module or the control unit of the charging station, for example. Further maintenance measures may then be initiated if appropriate. The monitoring may be carried out by virtue of the communication module transmitting the currently set value to the calibration device after the value of the at least one communication parameter to be set has been set, the calibration device comparing the value transmitted from the communication module with the value previously transmitted to the communication module and outputting a fault message or a success message on the basis of the comparison. In addition, the signal parameter that is now changed on account of the changed communication parameter may be re-determined and the communication parameter may be re-adapted if appropriate, thus making it possible to achieve a method of operation of a control loop. As a result, it is also possible to at least partially adapt to possibly changing boundary conditions during intended operation of the charging station. This development may be taken into account, for example, if the motor vehicle also includes a calibration device. For example, the charging operation may be interrupted in order to be able to perform a further adaptation.

It also proves to be advantageous if the coupling of the calibration device to the interface is locked. This has the advantage that a secure connection may be achieved between the calibration device and the interface. The locking may be carried out mechanically by mechanically connecting a plug-in connector of the calibration device to a corresponding complementary plug-in connector of the interface, for example. The locking may be carried out, for example, by latching lugs, bayonet closures or screws and/or the like.

The interface may be at least partially provided by a charging cable of the charging station and/or the calibration device is at least partially provided by a charging connector. The interface may be easily integrated in charging stations. This is because, if the interface is formed by the charging cable, there is no longer any need to provide a separate hardware interface on the charging station. Rather, the charging cable suffices to be able to be communicatively connected to the communication module. In this context, it likewise proves to be advantageous if the calibration device is at least partially provided by a charging connector. This makes it possible to easily establish the connection of the calibration device to the communication module, for example via the charging cable. This configuration proves to be particularly advantageous, for example, when a charging connector of the motor vehicle simultaneously also includes the calibration device. This is because, in this case, only the charging cable then needs to be connected to the charging connector of the motor vehicle. A charging operation may initially not yet be activated, but rather only when the setting operation has ended.

For example, it proves to be advantageous if wired communication is at least partially provided via at least two electrical lines of the charging cable, that are also at least partially used to provide a charging voltage of the charging station, and/or a pilot line of the charging cable. As a result, a separate interface no longer needs to be provided. Rather, it is possible to use an installation of the charging station on the hardware side, as is already provided for in charging stations of the generic type. It proves to be advantageous if communication is affected solely via the at least two electrical lines of the charging cable because the separate pilot line in the charging cable may then be dispensable at least for this purpose. At least the communication quality and reliability may be improved.

DETAILED DESCRIPTION

Figure 1:
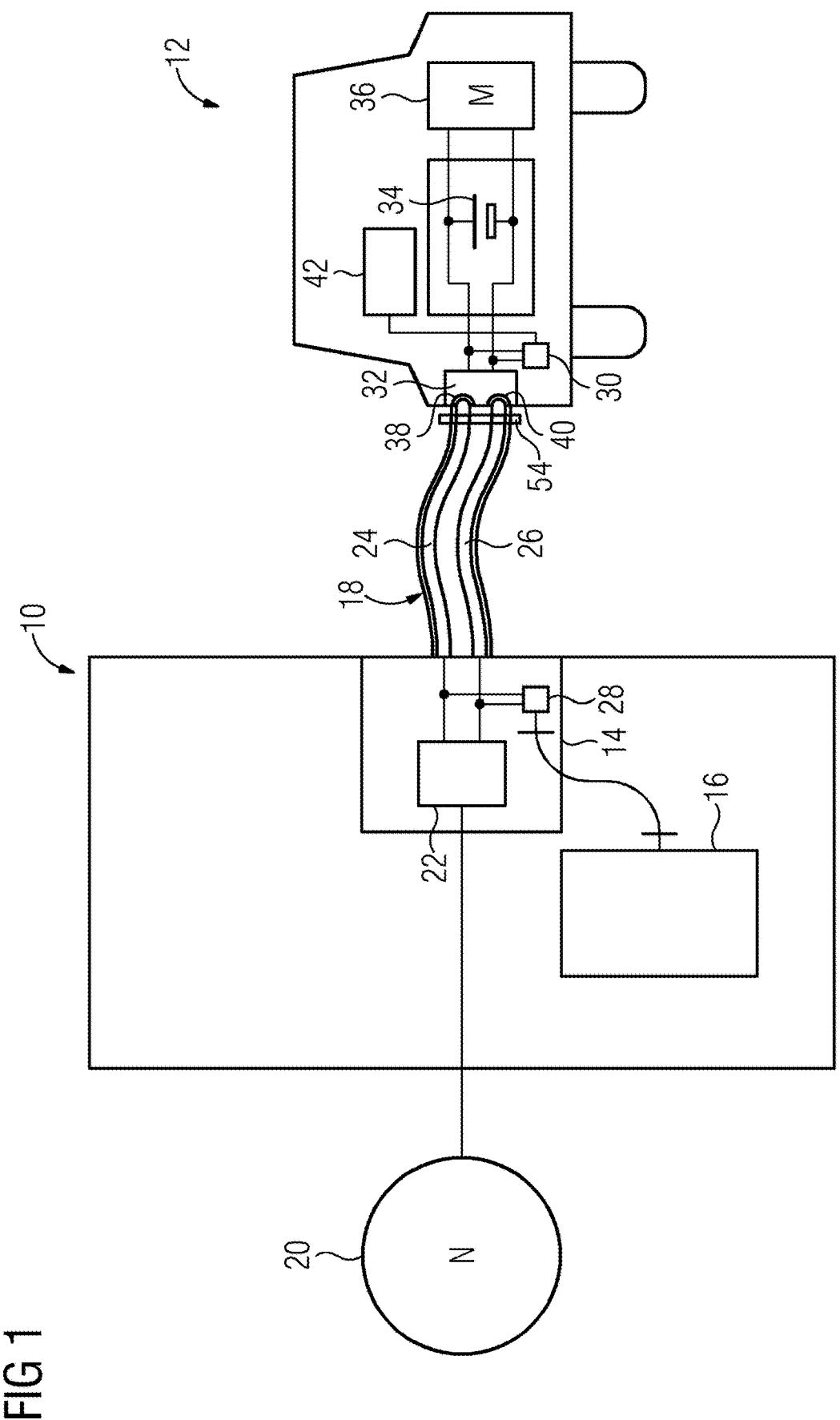
FIG. 1 depicts a schematic illustration of a charging station to which a motor vehicle is connected for the purpose of supplying electrical energy from the charging station to the motor vehicle according to an embodiment.

FIG. 1 depicts a schematic illustration of a charging station 10 for supplying electrical energy to a motor vehicle 12 that is electrically coupled to the charging station 10 and is an electric vehicle. The motor vehicle 12 may also be a hybrid vehicle or a conventional motor vehicle.

The charging station 10 includes a charging unit 14 that is used to provide the electrical energy for the motor vehicle 12. For this purpose, the charging unit 14 is connected, for the purpose of receiving electrical energy, to an energy source 20 outside the charging station, here a public energy supply network that provides the electrical energy using an electrical AC voltage. In the present case, the charging unit 14 also includes an energy converter 22 that is used to convert the electrical energy received from the energy source 20. For this purpose, the energy converter 22 is configured with a rectifier function and a DC/DC converter in the present case.

The charging station 10 also includes a control unit 16 that is coupled to the charging unit 14 using communication technology and is configured to establish a communication connection to the motor vehicle 12 and to set the supply of electrical energy on the basis of received energy storage data relating to the motor vehicle. The energy converter 22 may be controlled in a suitable manner using the control unit 16.

The charging station 10 also includes an electrical charging connection cable 18 as a charging cable, a first end of which charging connection cable is electrically coupled to the charging unit 14 and which charging connection cable includes, in the present case, precisely two electrical lines 24, 26 for providing an electrical charging voltage that is a DC voltage in the present case. The charging connection cable 18 includes, at a second end opposite the first end, a plug-in connector 54 that is used to releasably electromechanically couple a charging connection unit 32 of the motor vehicle 12 that includes a suitable plug-in connector.

The charging station 10 also includes a communication adapter 28, that is coupled to the control unit 16 using communication technology and is connected to the at least two electrical lines 24, 26, as a communication module for establishing the communication connection to the motor vehicle 12 via the two electrical lines 24, 26.

The communication adapter 28 is configured to use modulation adapted to line properties of the charging connection cable 18, for which purpose the communication adapter includes an accordingly configured modulator that is not illustrated and may be used to output accordingly modulated communication signals onto the two electrical lines 24, 26. Corresponding communication parameters are used for this purpose and may be used to set the electrical properties of the communication signals, a frequency and an amplitude in the present case. Moreover, alternatively, or additionally, other communication parameters may also be used. Some of the communication parameters may also be permanently predefined, with the result that they cannot be set. In addition, the communication adapter 28 includes a demodulator that is adapted to the modulation method and may be used to demodulate received communication signals. Corresponding communication parameters may also be used here, for example an attenuation and/or the like. The communication signals may include, for example, a data message 44 having data elements 46, as also explained further below using FIG. 2.

QAM modulation is used in the present case. However, other suitable modulation methods may also be used. The respective modulation method may be selected and/or set using one or more communication parameters.

The charging station 10 is installed as a charging pole at a parking space for the motor vehicle 12, with the result that the motor vehicle 12 parked in the parking space may be releasably coupled to the charging station 10 in an energy-related manner, electrically for example, by the charging connection cable 18, with the result that the charging station 10 may supply electrical energy to the motor vehicle 12.

The motor vehicle 12 is connected to the charging station 10 by the charging connection cable 18. The motor vehicle 12 includes the charging connection unit 32 with a plug-in connector (not designated) that is complementary to the plug-in connector 54 and includes two connection contacts 38, 40. The charging connection unit 32 is configured to electrically connect the electrical charging connection cable 18 of the charging station 10 to the two electrical lines 24, 26 for providing the electrical charging voltage.

The motor vehicle 12 also includes an electrical drive device 36 for driving the motor vehicle 12 in intended driving operation and an electrical energy store 34 that is electrically coupled to the drive device 36 and is in the form of a lithium ion rechargeable battery.

A rated voltage of the electrical energy store 34 is approximately 450 V. This voltage is a high voltage in the sense of standardization, for example the ECE R 100 standard. Certain standard requirements need to be complied with when operating electrical systems with high voltage. Both the charging station 10 and the motor vehicle 12 are accordingly configured for this.

The charging connection unit 32 is also electrically coupled to the energy store 34. A respective connection pole of the energy store 34 is electrically coupled to a respective one of the connection contacts 38, 40 of the charging connection unit 32, with the result that electrical energy may be supplied to the energy store 34 when the motor vehicle 12 is connected to the charging station 10, as illustrated in FIG. 1. However, it is also possible to take electrical energy from the energy store 34 in this manner.

The motor vehicle 12 also includes a vehicle control unit 42 that is coupled, using communication technology, to sensors that are not illustrated any further and may be used to capture state variables and/or parameters of the electrical energy store 34. In the present case, the state variables include a state of charge and a temperature of the energy store 34. An electrical rated voltage and a charging capacity of the energy store 34 are captured as parameters. The vehicle control unit 42 is configured to establish a communication connection to the charging station 10 and to transmit energy storage data to the charging station 10 via the communication connection in order to set the supply or possibly a removal of electrical energy on the basis of the energy storage data.

The energy storage data include a state of charge, a temperature and a rated power and a rated voltage of the electrical energy store 34. In addition, however, further state data relating to the electrical energy store 34 may be added if necessary or some of the energy storage data mentioned above may be omitted if this is expedient or useful for the current application.

The motor vehicle 12 also includes a communication adapter 30, that is coupled to the vehicle control unit 42 using communication technology and is connected to the two connection contacts 38, 40, for establishing the communication connection to the charging station 10 via the two electrical lines 24, 26 of the charging connection cable 18.

The communication adapter 30 is configured in substantially the same manner as the communication adapter 28 of the charging station 10. Depending on requirements, however, the communication adapter 30 may also be configured differently therefrom in order to be able to take into account motor-vehicle-specific properties, for example. Both the communication adapter 28 and the communication adapter 30 are configured to establish DC isolation between the communication connection to the control unit 16 or the vehicle control unit 42 and the electrical lines 24, 26. The communication adapters 28, 30 may have suitable transformers that allow a communication signal to be put onto the electrical lines 24, 26 without having to establish a galvanic connection or an electrically conductive connection. The communication adapters 28, 30 may use predefined modulation.

Communication signals may also be received by the communication adapters 28, 30 via the same communication coupling path. Received communication signals may be demodulated and possibly also decoded and, if necessary, also decrypted by the demodulators. Consequently, for transmission, the communication adapters 28, 30 may include a respective corresponding coder and a respective corresponding encryptor to be able to provide the data to be transmitted in a suitable manner for the communication connection.

A wide variety of modulation methods may be provided as modulation, for example amplitude modulation, frequency modulation, combinations thereof, digital modulation and/or the like.

In order to improve communication on the electrical lines 24, 26, the energy converter 22 may provide DC isolation. The lines 24, 26 are electrically isolated from a ground potential that is not illustrated. This makes it possible to reduce undesirable capacitive coupling that might impair communication via the electrical lines 24, 26.

The communication adapters 28, 30 may be configured to use digital communication based on a secure protocol standard. This is explained further below using FIG. 2 and FIG. 3 that depict, as a communication signal, a schematic illustration of a data message 44 including data elements 26, which data message may be used by the communication adapters 28, 30 to communicate with one another via the electrical lines 24, 26.

So that operational reliability with respect to communication may be provided during charging or during the supply of electrical energy from the charging station to the motor vehicle, even without the requirement for the pilot line, an association of the charging station 10 with the motor vehicle 12 may be provided. In addition, it may be possible to signal at least the state of charge, for example, with an interruption in the supply of the electrical energy in the event of a fault or when the charging connection cable 18 is detached from the charging connection unit 32. In addition, crosstalk may not only be able to be controlled, but rather may be able to be at least considerably reduced. As a result, a latency during communication via the communication connection may also be reduced and an actually available bandwidth during communication may be increased.

The reliable association between the charging station 10 and the motor vehicle 12 may be achieved by virtue of the fact that the communication signals are no longer ground-based using the pilot line, but rather are output onto any desired electrical lines of the charging connection cable 18, onto the electrical lines 24, 26. If the charging is carried out using a charging voltage that is a DC voltage, a positive line and an accordingly associated negative line may be used for this purpose. When using a charging voltage that is a single-phase AC voltage, these may be a phase line and an associated neutral line. If a multiphase, for example three-phase, AC voltage is used as a charging voltage, communication may be affected via at least two-phase lines. A ground line therefore does not need to be used for communication.

An attenuation of the crosstalk may be reduced by virtue of the fact that, in the case of charging with a DC voltage, an energy converter or a converter or a current source with a low coupling capacitance is implemented between an AC voltage side of the energy source 20 and a DC voltage side, of the charging connection cable 18, for example by virtue of the connection of the charging connection cable 18 to the energy source 20 being disconnected anyway, before the beginning of the starting of the charging operation or of the supply of electrical energy, by a contactor that is not illustrated. If an AC voltage is used as a charging voltage, radio-frequency filtering may be provided in a supply to the charging connection cable 18, for example at an energy supply or a connection for the energy source 20 outside the charging station or the like. The radio-frequency filtering may include, for example, a filter for line-conducted radio interference. As a result, an association mechanism, for example a Session Layer Attenuation Characterization (SLAC), may provide clearer results on account of the lower attenuation.

States of charge of the electrical energy store 34 may be securely transmitted by using automation mechanisms in which the corresponding state data are transmitted, as is also explained further below using FIG. 2 and FIG. 3.

Figure 2:
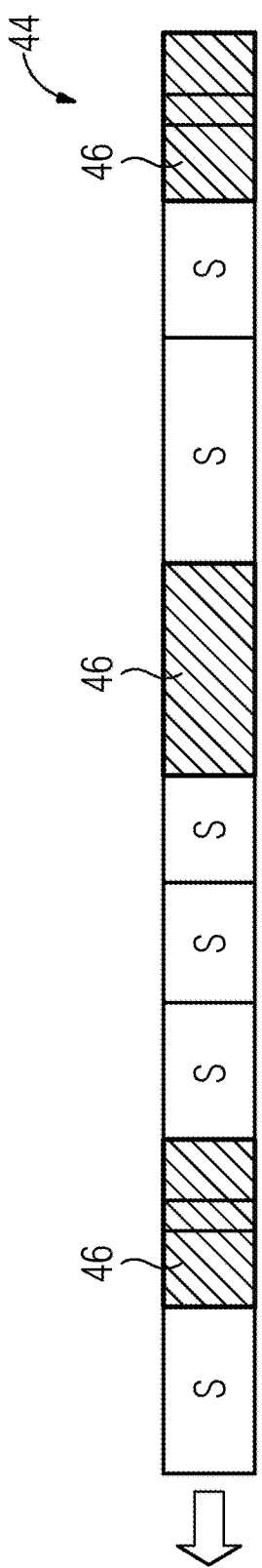
FIG. 2 depicts a schematic diagrammatic illustration of a data message having data elements as a communication signal, as is used for communication via a charging connection cable having two electrical lines according to FIG. 1 by respective communication adapters on the charging station side and the motor vehicle side according to an embodiment.

FIG. 2 depicts a schematic illustration of a data message 44, as may be used to establish the communication connection between the communication adapters 28, 30 via the electrical lines 24, 26. The data message 44 includes a sequence of a plurality of data stream segments that include standard data, including security process data units (protocol data unit, PDU) that are used for secure communication via the electrical lines 24, 26. A plurality of successive data stream sections S separate data elements 46 which structure is schematically illustrated in FIG. 3.

A continuous data stream that is affected in a bidirectional manner is provided. On account of the selected modulation, the bidirectional communication connection may be established at the same time, with the result that a full duplex communication connection is available.

Figure 3:
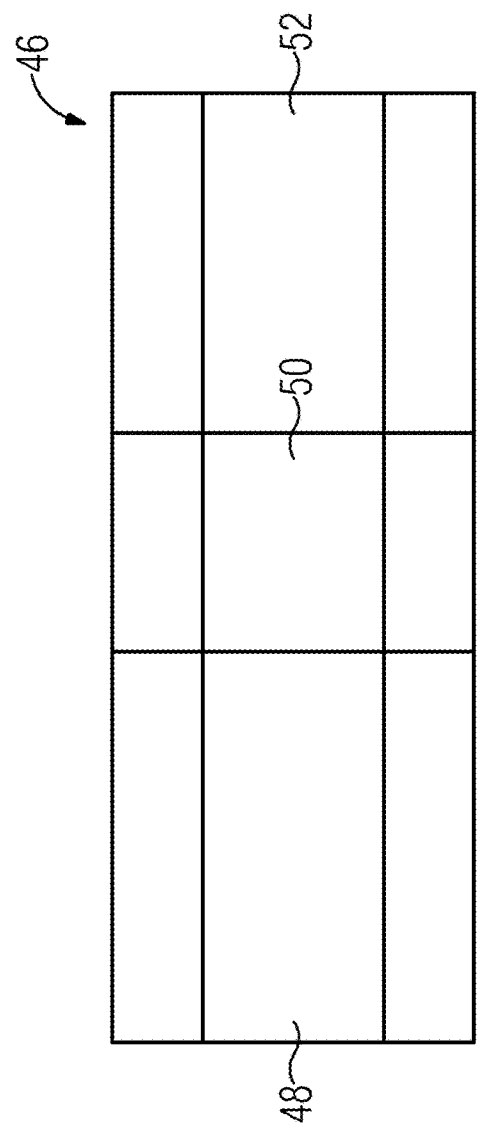
FIG. 3 depicts a schematic diagrammatic illustration of a data element of the data message according to FIG. 2 according to an embodiment.

FIG. 3 depicts a schematic illustration of one of the data elements 46 according to FIG. 2 in which state information relating to the electrical energy store 34 may be transmitted as F input/output data 48. The F input/output data 48 may include up to 123 bytes, for example. A status/control data item 50 immediately follows the F input/output data 48. This may include one byte of data.

Error correction data, for example error correction bytes 52, that may include three or four bytes for example, may then immediately follow. The error correction bytes 52 may be used to achieve error-tolerant coding of the data, with the result that, when the data element 46 is received, it is possible to check on the receiving side whether or not the F input/output data 48 have been corrupted. In addition, a certain number of errors may also be corrected.

This makes it possible to achieve a highly secure communication connection. In addition, the data to be transmitted in the data message 46 may also be additionally encrypted to better protect the security, for example with respect to impermissible interventions in communication. Corresponding encryption algorithms may be provided for this purpose.

In order to be able to achieve a high degree of safety with respect to the communication connection, a monitoring time may be provided that is less than approximately 20 ms, for example approximately 16 ms or approximately 8 ms or less.

After expiry of the monitoring time, a safety error may be detected and safety-critical settings, for example the supply of energy from the charging station 10 to the motor vehicle 12, may be disconnected. The configuration of the system provides good availability with respect to the data to be transmitted.

As a result, if individual data elements are lost, although a slightly increased transmission latency and/or an additional processing time may occur in the communication adapters 28, 13, a time-out error and resulting termination of the supply of energy from the charging station 10 to the motor vehicle 12 may be largely avoided.

In order to further increase the safety of the communication connection, a current desired value for the supply of the electrical energy from the charging station 10 to the motor vehicle 12 may also be transmitted, for example using the secure communication described above, for example in the same data element 46 with the previously described short cycle. In contrast to cycle times of approximately 60 s, for example, that are used in the prior art, a safe direct connection may be implemented as a communication connection between the charging station 10 and the motor vehicle 12 if the cycle time is selected.

The data message 44 illustrated in FIG. 2 may be implemented using framing, as is known, for example, from Ethernet in which corresponding Ethernet frames are used, for example. Taking into account the OSI layer model, a communication failure may be detected on account of the monitoring time being exceeded on layer 7 which makes it possible to monitor the order of the data elements 46.

Overall, communication between the charging station 10 and the motor vehicle 12 and also the charging connection cable 18 may be simplified. The pilot line that is susceptible to interference in the case of ground-based communication may be completely dispensed with. In addition, existing communication concepts based on Profinet/Profisafe, for example, may be used or imported and thereby allows Simatic-compatible solutions to be enabled.

Embodiments are not restricted to wired charging and may be used in the case of wireless energy-related coupling, for example inductive charging or the like. The communication connection between the charging station and the communication module may also be wireless, for example based on short-range radio, infrared, ultrasound and/or the like.

Figure 4:
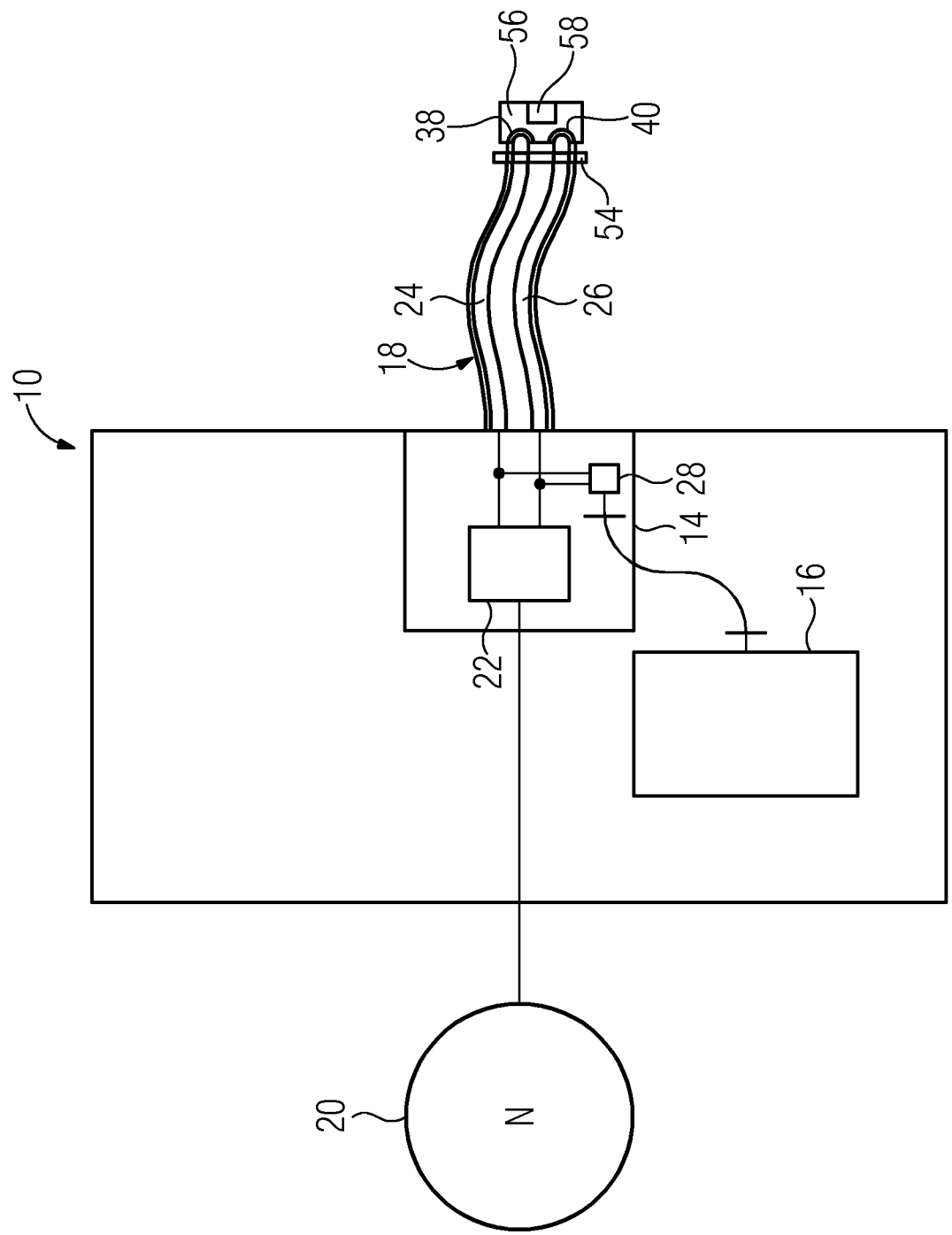
FIG. 4 depicts a schematic illustration of a calibration connector that is connected to the charging connection cable of the charging station for the purpose of setting communication parameters according to an embodiment.

FIG. 4 depicts a schematic illustration, like FIG. 1, of the charging station 10, as was previously explained with respect to the charging of the motor vehicle 12. In contrast to the illustration according to FIG. 1, a calibration device 56, instead of the motor vehicle 12 or its charging connection unit 32, is connected to the plug-in connector 54 on the charging connection cable 18 in the illustration according to FIG. 4. The calibration device 56 includes connection contacts 38, 40 that make contact with the corresponding lines 24, 26 of the charging connection cable 18. A releasable electromechanical plug-in connection is also provided.

The calibration device 56 is a portable device that includes a control unit 58 that is electrically coupled to the connection contacts 38, 40. The control unit 58 is used to store authentication data in the form of a file and to be communicatively connected to the communication adapter 28 of the charging station 10 via the charging cable 18 according to a predefined communication standard. For this purpose, the calibration device 56 uses the same communication standard as that already explained above with respect to the operation of charging the motor vehicle 12 at the charging station 10.

The calibration device 56 is used to set the above-mentioned communication parameters of the communication adapter 28 in order to provide reliable communication during the intended operation of the charging station 10. With respect to the possible communication parameters of the communication adapter 28, reference is likewise made to the statements above. The charging cable 18 also simultaneously provides an interface that may be coupled to the calibration device 56 to be able to set the communication parameters in the desired manner.

As soon as the calibration device 56 is electrically coupled to the charging connection cable 18 and also to the communication adapter 28, the authentication data are transmitted from the control unit 58 to the communication adapter 28.

As soon as the authentication data have been received and verified by the communication adapter 28, the communication adapter 28 transmits a predefined data message 44, as has already been explained above with respect to FIG. 2. The calibration device 56, for example the control unit 58, receives the communication signal, evaluates the communication signal with respect to the relevant communication parameters and then determines signal parameters therefrom. The determined signal parameters are then transmitted from the calibration device 56 to the communication adapter 28.

The communication adapter 28 receives the signal parameters and sets its corresponding communication parameters on the basis of the signal parameters. The authentication data have already been evaluated by this time. The data message 44 may be emitted by the communication adapter 28 even before the calibration device 56 is authenticated. The authentication of the calibration device 56 may then be carried out or checked before the communication parameters are set by the communication adapter 28 and the setting operation should be carried out on the basis of the evaluation of the authentication data from the calibration device 56. In addition, it is also possible to provide other modifications.

In order to evaluate the signal parameters, the communication adapter 28 provides for values for the communication parameters to be determined therefrom. In this configuration, the calibration device 56 substantially needs a receiving unit that allows the corresponding signal parameters to be determined from the data message 46, with the result that the communication adapter 28 may determine the desired values for the communication parameters from the signal parameters. Accordingly, a transmitting unit is included so that the signal parameters may be transmitted from the calibration device 56 to the communication adapter 28.

In the present case, the communication parameters of the communication adapter 28 are set in an automated manner, as soon as the calibration device 56 has been authenticated. Therefore, there is no need for any further user input, for example by maintenance personnel or the like.

In addition, it is possible to use the calibration device 56 to monitor whether the communication adapter 28 has set the communication parameters in the predefined manner. The calibration device 56 may emit a query signal to the communication adapter 28, for the latter to receive and evaluate the query signal and for the current communication parameters that have been set to be transmitted back to the calibration device 56 as a response. The control unit 58 of the calibration device 56 may then compare the received set values of the communication parameters with values for the communication parameters that have been determined by the control unit 58 itself on the basis of the signal parameters. This makes it possible to monitor the setting functionality of the communication adapter 28.

Finally, it is also possible, according to a further aspect, for the calibration device 56 to evaluate the data message 44 and to determine values for the communication parameters therefrom. Therefore, no signal parameter needs to be transmitted to the communication adapter at this point, and the communication adapter 28 then does not itself need to determine values for the communication parameters from the signal parameters. Instead, the values for the communication parameters are determined by the control unit 58 of the calibration device 56 and are directly transmitted to the communication adapter 58 in contrast to the previous configuration. The communication adapter 58 receives the values for the communication parameters and sets its communication parameters according to the values transmitted from the calibration device 56 as soon as the authentication has been verified on the basis of the authentication data that have been transmitted from the calibration device 56 to the communication adapter 28. A monitoring functionality as explained above may also be provided here.

Embodiments are not restricted to implementing a wired communication connection via the electrical lines 24, 26 of the charging connection cable 18. It may likewise also be used when communication is affected using a pilot line of the charging connection cable 18.

In addition, the calibration device 56 may be formed in one piece with the charging connection unit 32 of the motor vehicle 12. In the case of such a configuration, it is then possible for a setting method to already be able to be carried out on account of the motor vehicle 12 being connected to the charging station 10. The charging operation may not yet be carried out during the setting operation. This configuration is therefore also suitable, for example, for initial activation of a charging station 10 that has just been installed.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for setting at least one communication parameter of a communication module of a charging station, wherein the communication module is used for wired communication via an interface of the charging station, the charging station arranged in a stationary manner and configured to be coupled in terms of energy transmission to an electrical vehicle using a wired energy transmission, the method comprising:
 transmitting authentication data, using the wired communication, from a calibration device to the communication module, the calibration device coupled to the interface;
 transmitting, using the wired communication, a value for the at least one communication parameter from the calibration device to the communication module; and
 setting the at least one communication parameter by the communication module on a basis of an evaluation of the authentication data by the communication module according to the transmitted value.

2. The method of claim 1, further comprising:
 receiving by the calibration device a communication signal from the communication module; and
 determining by the calibration device the value for the at least one communication parameter on the basis of the received communication signal.

3. The method of claim 2, wherein the communication signal comprises at least one data message and the value is determined on the basis of the at least one data message.

4. The method of claim 1, wherein the value, a change of the value, or the value and the change of the value of the at least one communication parameter is transmitted to a control center.

5. The method of claim 1, wherein the at least one communication parameter is set in an automated manner if the calibration device has been authenticated.

6. The method of claim 1, wherein the setting of the at least one communication parameter is monitored by the calibration device.

7. The method of claim 1, wherein the coupling of the calibration device to the interface is locked.

8. The method of claim 1, wherein the interface is at least partially provided by a charging cable of the charging station, the calibration device is at least partially provided by a charging connector, or the interface is at least partially provided by the charging cable of the charging station and the calibration device is at least partially provided by the charging connector.

9. The method of claim 8, wherein the wired communication is at least partially effected via at least two electrical lines of the charging cable that are at least partially also used to provide a charging voltage of the charging station, a pilot line of the charging cable, or the charging voltage of the charging station and the pilot line of the charging cable.

10. A method for setting at least one communication parameter of a communication module of a charging station arraigned in a stationary manner and configured to be coupled in terms of energy transmission to an electrical vehicle using a wired energy transmission, wherein the communication module is used for wired communication via an interface of the charging station, the method comprising:
transmitting, using the wired communication, authentication data from a calibration device to the communication module, wherein the calibration device is coupled to the interface;
receiving, using the wired communication, by the calibration device a communication signal from the communication module;
evaluating, by the calibration device, the communication signal to determine at least one signal parameter;
transmitting, using the wired communication, the at least one signal parameter from the calibration device to the communication module; and
setting, by the communication module, the at least one communication parameter on the basis of the at least one signal parameter and an evaluation of the authentication data.

11. The method of claim 10, wherein the communication signal comprises at least one data message and the signal parameter is determined on the basis of the at least one data message.

12. The method of claim 10, wherein the at least one communication parameter is set in an automated manner if the calibration device has been authenticated.

13. The method of claim 10, wherein t the setting of the at least one communication parameter is monitored by the calibration device.

14. The method of claim 10, wherein the coupling of the calibration device to the interface is locked.

15. The method of claim 10, wherein the interface is at least partially provided by a charging cable of the charging station, the calibration device is at least partially provided by a charging connector, or the interface is at least partially provided by the charging cable of the charging station and the calibration device is at least partially provided by the charging connector.

16. The method of claim 15, wherein the wired communication is at least partially effected via at least two electrical lines of the charging cable that are at least partially also used to provide a charging voltage of the charging station, a pilot line of the charging cable, or the charging voltage of the charging station and the pilot line of the charging cable.

17. A calibration device for setting at least one communication parameter of a communication module of a charging station arranged in a stationary manner and configured to be coupled in terms of energy transmission to an electrical vehicle using a wired energy transmission, wherein the communication module is used for wired communication, via an interface of the charging station wherein the calibration device is configured to:
be coupled to the interface;
transmit, by the wired communication, authentication data to the communication module; and
transmit, by the wired communication, a value for the at least one communication parameter to the communication module so that the communication module sets the at least one communication parameter on the basis of the transmitted value and an evaluation of the authentication data by the communication module.

18. A communication module for a charging station wherein the communication module is used for wired communication via an interface of the charging station arraigned in a stationary manner and configured to be coupled in terms of energy transmission to an electrical vehicle using a wired energy transmission and, in order to set at least one communication parameter, is configured to:
receive, by the wired communication, authentication data from a calibration device that is coupled to the interface, emit, by the wired communication, a communication signal to the calibration device, wherein the calibration device evaluates the communication signal and determines at least one signal parameter on the basis of the received communication signal;
receive, by the wired communication, the at least one signal parameter from the calibration device; and
set the at least one communication parameter on the basis of the at least one signal parameter and an evaluation of the authentication data.

* * * * *